United States Patent
Sutti

(10) Patent No.: US 9,327,289 B2
(45) Date of Patent: May 3, 2016

(54) MINERAL MATERIAL PROCESSING PLANT AND METHOD

(75) Inventor: Risto Sutti, Tampere (FI)

(73) Assignee: Metso Minerals, Inc., Helsinki (FI)

( * ) Notice: Subject to any disclaimer, the term of this patent is extended or adjusted under 35 U.S.C. 154(b) by 168 days.

(21) Appl. No.: 14/128,698

(22) PCT Filed: Feb. 16, 2012

(86) PCT No.: PCT/FI2012/050151
§ 371 (c)(1),
(2), (4) Date: Feb. 18, 2014

(87) PCT Pub. No.: WO2013/004889
PCT Pub. Date: Jan. 10, 2013

(65) Prior Publication Data
US 2014/0191067 A1    Jul. 10, 2014

(30) Foreign Application Priority Data

Jul. 1, 2011    (FI) .................................. 20110172 U

(51) Int. Cl.
| | |
|---|---|
| B02C 1/02 | (2006.01) |
| B02C 23/04 | (2006.01) |
| F16F 1/373 | (2006.01) |
| F16F 1/44 | (2006.01) |
| B02C 1/00 | (2006.01) |

(52) U.S. Cl.
CPC . *B02C 23/04* (2013.01); *B02C 1/00* (2013.01); *B02C 1/02* (2013.01); *F16F 1/3737* (2013.01); *F16F 1/44* (2013.01)

(58) Field of Classification Search
CPC ............ B02C 23/04; B02C 1/02; B02C 1/00; F16F 1/44; F16F 1/3737
USPC ............................................ 241/27, 264–269
See application file for complete search history.

(56) References Cited

U.S. PATENT DOCUMENTS 5,172,869 A * 12/1992 Kitsukawa et al. ........... 241/264

FOREIGN PATENT DOCUMENTS

| DE | 195 37 592 A1 | 3/1997 |
|---|---|---|
| EP | 0 641 600 A2 | 3/1995 |
| EP | 1 424 132 A1 | 6/2004 |
| SU | 541496 * | 3/1977 |
| SU | 617071 * | 7/1978 |
| WO | 2008/010064 A2 | 1/2008 |

OTHER PUBLICATIONS

PCT International Search Report dated Feb. 7, 2012.
Written Opinion dated Feb. 7, 2012.
Machine Translation of DE 195 37 592.
Machine Translation of EP 0 641 600.

* cited by examiner

*Primary Examiner* — Mark Rosenbaum
(74) *Attorney, Agent, or Firm* — Andrus Intellectual Property Law, LLP

(57) ABSTRACT

A mineral material processing plant includes a frame having two or more upper support surfaces and a jaw crusher including a crusher body having at least two bottom support surfaces at a distance from each other. The processing plant further includes at least one damper to be arranged in between the bottom and upper support surfaces which damper includes a first counter surface for the bottom support surface and a second counter surface for the upper support surface and an elastic material layer between the counter surfaces and preferably a slide joint between the first counter surface and the bottom or upper support surface. A method for damping a jaw crusher in a mineral material processing plant is also disclosed.

14 Claims, 3 Drawing Sheets

MINERAL MATERIAL PROCESSING PLANT AND METHOD

CROSS-REFERENCE TO RELATED APPLICATIONS

This application claims priority to PCT/FI2012/050151, filed Feb. 16, 2012, and published in English on Jan. 10, 2013 as publication number WO 2013/004889, which claims priority to FI Application No. 20110172, filed Jul. 1, 2011, incorporated herein by reference.

FIELD OF THE INVENTION

The invention relates to a mineral material processing plant and a method for damping a crusher in a mineral material processing plant. Particularly, though not exclusively, the invention relates to fixing of a crusher to a frame of a movable processing plant.

BACKGROUND OF THE INVENTION

Mineral material such as rock is gained from the earth for processing by exploding or excavating. Rock can also be natural and gravel or construction waste. Mobile crushers and stationary crushing applications are used in the crushing. An excavator or wheeled loader loads the material to be crushed into a feed hopper of the crusher or the processing plant from where the material to be crushed may drop in a jaw of the crusher or a feeder feeds the rock material towards the crusher. The mineral material to be crushed can also be recyclable material such as concrete, bricks or asphalt.

A jaw crusher 100 according to prior art is shown in FIG. 1a. Jaw crushers are suitable, for example, coarse crushing in quarries or crushing of construction material. According to the function principle of the jaw crusher the crushing takes place against jaws, the so called fixed and movable jaws. The body of the jaw crusher is formed of a front end 101 and a rear end 101' and side plates. The fixed jaw 102 is fixed to the front end of the jaw crusher which fixed jaw is receiving the crushing forces. The movable jaw 103 is fixed to a pitman, the eccentric movement of which movable jaw is generated by rotating an eccentric shaft. The jaw crusher also comprises a belt wheel 104, V-belts 107, a motor 105 and belt wheel 106 of the motor for moving the movable jaw 103. The rock material is crushed between the jaws and is conveyed after the crushing for instance along a belt conveyor to further processing. The crusher also comprises two-part fixing means 110, 110' for fixing the crusher 100 to frame structures 121 of the processing plant.

The jaw crusher is isolated notoriously from the frame by means of dampers and rubber stoppers. A prior art two-part fixing means 110 is shown in FIG. 1b comprising a fixing piece 111 with for example L-profile form which is fixed (welding or bolt joint) to the crusher, the fixing piece having a bottom surface and two side surfaces, the one side surface in longitudinal direction and the other side surface in cross direction of the machine. The fixing piece also comprises an angle piece 112 with for example L-profile form which is fixed to the frame 121 of the processing plant, a so called end stopper which is preventing the movement of the crusher in machine direction, that is the longitudinal movement. Rubber stoppers 115, 115' to be pre-tightened with screws are increasing longitudinal rigidity.

There is preferably a material layer 113 of elastic material such as rubber between the bottom surface of the fixing piece 111 and an upper surface of the frame 121 of the processing plant, the object of the material layer being damping forces machine direction influencing the crusher for example caused by impacts of stones. The side surface of the fixing piece 111 which is perpendicular to the longitudal direction and the corresponding side surface of the angle piece 112 which is perpendicular to the longitudinal direction are located at a distance from each other and fixed to each other by a bolt joint 114 such that there are rubber stoppers 115, 115' between the fixing and angle pieces and the bolt joint.

Crushing forces and the material which is dropping in the jaw of the crusher are causing loads to the crusher which are lead to the surrounding structures via the body of the crusher. The dropping of a large stone in the jaw and the crushing of the stone may cause so heavy forces in the machine direction that this may result to damages of the stopper fixings.

In case of a movable, particularly track based, processing plant the fixing means are under even heavier stress. For example, when the crushing plant is moving on an uneven terrain there are caused forces which are straining the frame structures of the processing plant. Forces caused by momentary torsions of the frame of the processing plant are straining the fixing means 110, 110' because the jaw crusher itself is a rigid and inflexible body and, therefore does not necessarily bend like the frame of the processing plant. In a worst case the crushing plant may be in a cross-supported state due to the unevenness of the terrain wherein the frame of the crushing plant is bent downwards at crosswise located corners. Then, heavy vertical stresses are caused to the fixing means in said corners which may also lead to damages of for example bolts, damping rubbers or welding seams of supports.

The current support of the jaw crusher with the stoppers is not very cost effective solution. The two-part fixing means comprises several parts of which some are also very heavy which is increasing the manufacture and mounting costs thereof.

Because of the excessive vibration one has been driven with the jaw crushers to more rigid rubber dampers and stoppers below the resonance frequency to an amplification area where the ratio of impulse to natural frequency is lower than 1. The excessive vibration damages guard plates, fuel tanks and railings of the maintenance bridges. The vibration is also detrimental for electric components and the motor. Mounting of the damper stoppers is inconvenient and time consuming. There have often occurred problems with the pre-tightening of the screws. If the stoppers are not well pre-tightened the total spring constant in longitudinal machine direction is substantially smaller and one is near the resonance.

An object of the invention is to provide a crushing plant and a support structure of the crusher by which problems associated with the prior art may be avoided or at least minimized.

SUMMARY

According to a first example aspect of the invention there is provided a mineral material processing plant comprising a frame having at least two upper support surfaces at a distance from each other in longitudinal direction of the processing plant, and a jaw crusher comprising a body having at least two bottom support surfaces at a longitudinal distance from each other. The processing plant further comprises at least one damper to be arranged in between the bottom and upper support surfaces which damper comprises a bottom support surface counterpart and a upper support surface counterpart and an elastic material layer between said counterparts.

According to a second example aspect of the invention there is provided a mineral material processing plant comprising a processing plant frame having at least two upper support surfaces at a distance from each other in longitudinal direction of the processing plant, and a jaw crusher comprising a crusher body having at least two bottom support surfaces at a longitudinal distance from each other, and the processing plant further comprises at least one first damper or second damper to be arranged in between the bottom and upper support surfaces which damper comprises a bottom support surface first counterpart and a upper support surface second counterpart and an elastic material layer between said counterparts which elastic material layer is fixed non-detachable to the first counterpart and to the second counterpart.

Preferably the second damper comprises a slide joint between the first counterpart and the second bottom or upper support surface, and a bolt or welding joint between the second counterpart and the upper or bottom support surface.

Preferably the first damper comprises a bolt or welding joint between the first counterpart and the second bottom or upper support surface, and between the second counterpart and the upper or bottom support surface.

Preferably the elastic material layer of the first and/or second damper is of rubber. Preferably the elastic material layer is vulcanized to the first counterpart of steel and the second counterpart of steel.

Preferably a side support is arranged to the second damper or to the frame of the processing plant or to the body of the crusher for positioning the frame/body relative to the second damper.

According to a third example aspect of the invention there is provided a method for damping a jaw crusher in a mineral material processing plant which comprises a processing plant frame having at least two upper support surfaces at a distance from each other in longitudinal direction of the processing plant, and a jaw crusher comprising a crusher body having at least two bottom support surfaces at a longitudinal distance from each other, and the method comprising arranging at least one first damper or second damper in between the bottom support surface and the upper support surface which damper comprises a bottom support surface first counterpart and a upper support surface second counterpart and an elastic material layer between said counterparts which elastic material layer is fixed non-detachable to the first counterpart and to the second counterpart.

Preferably the method comprising arranging shearing constant in side direction substantially equal as in machine direction.

Preferably the method comprising arranging substantially one natural frequency for the first and second dampers.

Hardness of rubber used in the elastic material layer may be 40 to 80 ShA, preferably 60 ShA.

The invention is providing as advantages direction of smaller stress forces to the dampers in connection with impact-like loads which are higher than normally. Lesser parts in the dampers and the supports is leading to a simpler structure. A weight addition brought along with the end stoppers is left away which is saving material costs.

The invention further provides for the damper an equal shear spring constant both in longitudinal and side directions.

The lifetime of crushing critical points (among others, the welding joints) of a frame of a movable processing plant and a base frame of a stationary processing plant is increasing. An installation is simple wherein the installation costs remain lower than before. Additionally, a better damping against impact-like loads is achieved with the invention.

Different embodiments of the present invention will be illustrated or have been illustrated only in combination with one or some aspects of the invention. A person skilled in the art understands, that any embodiment of one aspect of the invention may be applied in the same aspect of the invention and in other aspects alone or as a combination with other embodiments.

BRIEF DESCRIPTION OF THE DRAWINGS

The invention will be described, by way of example, with reference to the accompanying drawings, in which.

DETAILED DESCRIPTION

In the following description, like numbers denote like elements. It should be appreciated that the illustrated drawings are not entirely in scale, and that the drawings mainly serve the purpose of illustrating embodiments of the invention.

Figure 2A:
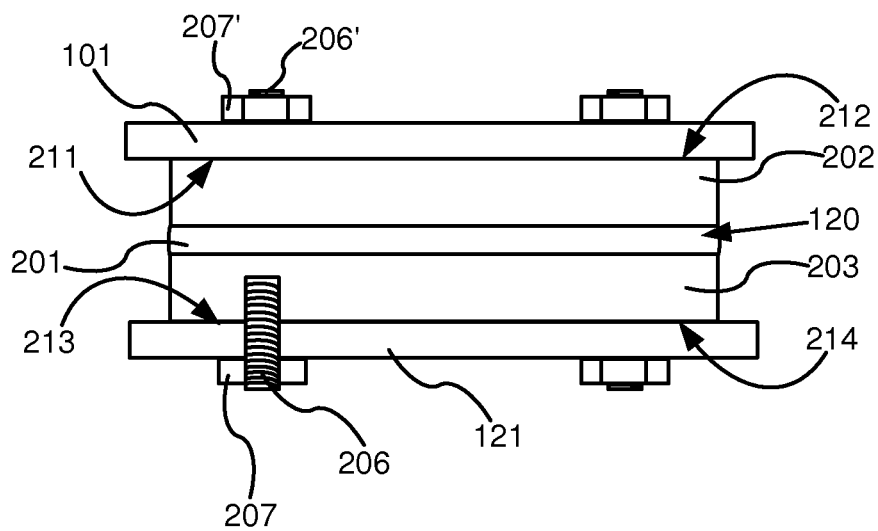
FIG. 2a shows a damper according to an embodiment of the invention.

FIG. 2a shows a first damper 210 according to a first embodiment the invention which is in the figure fixed to a body 101 of a jaw crusher and a frame 121 of a processing apparatus by bolt joints 206, 207, 206', 207'.

The body 101 of the jaw crusher is in this example a fixed part of the body or alternatively a separate support structure fixed to the body which support structure comprises a bottom surface and in the bottom surface a substantially planar support surface, a bottom support surface 211. The bottom support surface is preferably wear resistant and a surface produced of hard material such as steel which is machined to a planar surface.

The frame 121 of the processing plant is in this example a fixed part of the frame or alternatively a separate support structure fixed to the frame which support structure comprises an upper surface and in the upper surface a substantially planar support surface, an upper support surface 213. Also the upper support surface is preferably wear resistant and a surface produced of hard material such as steel which surface is preferably machined.

The first damper 210 further comprises a plate-like second counterpart 203 also produced of wear resistant material having a bottom surface which is forming a second counter surface 214 for the upper support surface 213 of the frame 121 of the processing apparatus or a support fixed to the frame. The second counterpart 203 is produced preferably of steel and the surface of the second counterpart is preferably machined. A threaded bolt is fixed to the counterparts 202 and 203 for example by casting, or by machining threads to the counterparts.

Figure 2B:
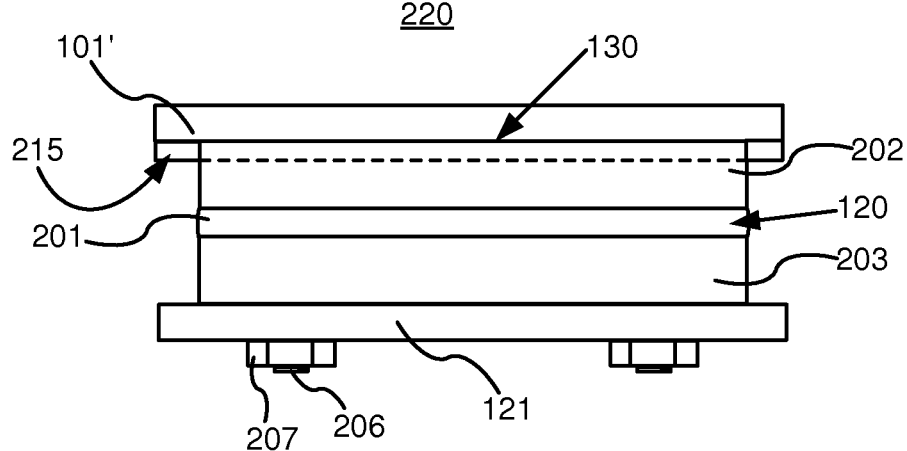
FIG. 2b shows a damper according to another embodiment of the invention.

FIG. 2b shows a second damper 220 according to a second embodiment the invention which is similar in structure with the first damper 210 shown in FIG. 2a. A difference with regard to the previous is the joint 130 between the body 101' of the jaw crusher and the first counterpart 202 with no bolt joint, but the fixing takes place by friction formed by weight directed to the joint by the crusher.

The slide joint 130 between the body 101 of the jaw crusher and the frame 121 of the processing apparatus is providing many advantages compared to solutions of prior art. The elastic material layer 120 between the first counterpart 202 and the second counterpart 203 is damping impact-like vibrations. If a horizontal force caused by an impact or another reason is of such magnitude that it exceeds an operating limit of the second damper, the slide joint 130 is receiving the excessive movement in such exceptional situations. The bottom support surface of the jaw crusher body and the first counter surface of the second damper 220 can move freely horizontally when a moving force is preventing a revealing of a static friction which is required for movement start. Another advantage can be seen when the processing apparatus is moving on an uneven terrain and the frame thereof is living according to changes in terrain shape. Then the frame of the processing apparatus may move vertically relative to the jaw crusher body wherein the slide joint is working also in this direction because the bottom support surface 211 and the first counter surface can freely detach from each other.

A side support 215 is arranged in connection with the jaw crusher body 101 and the second damper 220 which side support can be implemented by for example machining to the surface of the body/frame. The purpose of the side support is to position the non-fixed end of the jaw crusher body in a right position relative to the dampers during installation and to prevent an excessive transition in side direction of the jaw crusher body during operation.

The elastic material layer 120 is between the counterparts 202 and 203, for example produced of rubber, which elastic material layer is fixed to the above and below located counterparts for example by vulcanizing or by another suitable fixing method. Additionally to rubber also another elastomer or polymer material (for example polyurethane) can be selected as material.

In an embodiment in which the total mass of the jaw crusher on the dampers is 30 000 kg (four dampers, one in each corner of the crusher) and in which the rotational speed o the crusher is 230 rpm, a rubber plate can be used having dimensions: width 220 mm, length 380 mm and height 12 mm. Hardness of rubber in the application in question is 60 ShA. Because the shear spring constant of the rubber plate is depending on the area, the ratio of width and length can be selected more freely suitable for the operating location.

Figure 1A:
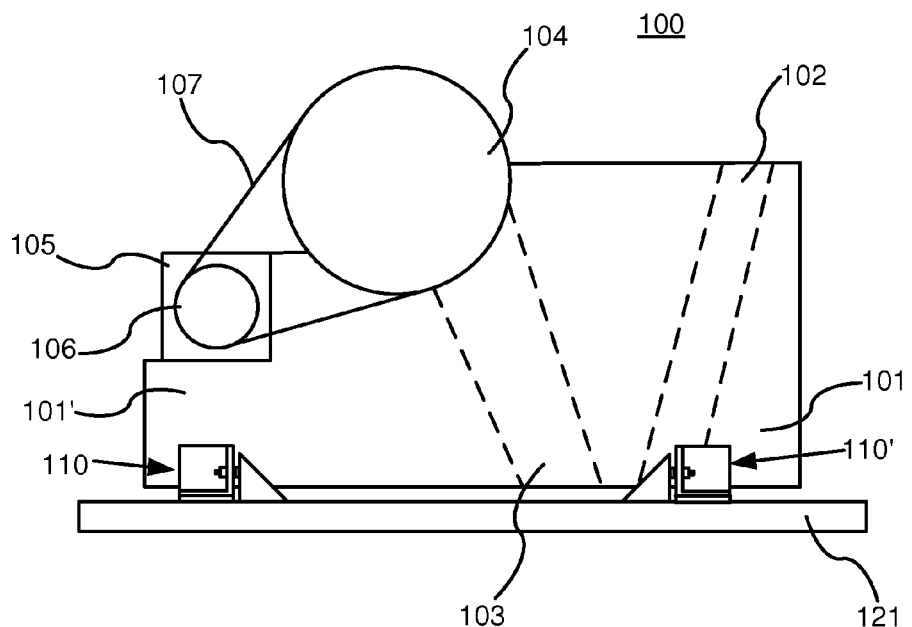
FIG. 1a shows a jaw crusher according to prior art.
Figure 1B:
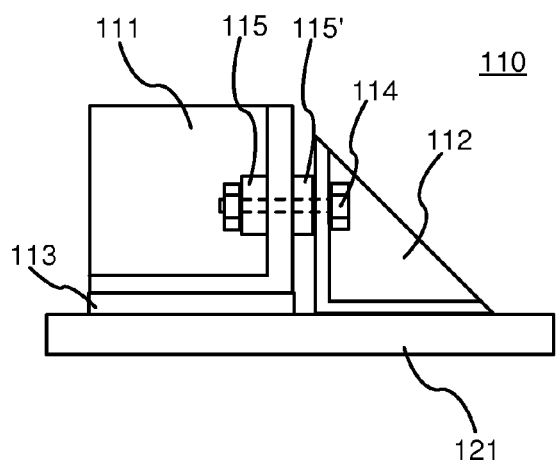
FIG. 1b shows a fixing means of a jaw crusher according to prior art.

In the embodiment of the previous example the dimensions of the damper 210, 220 are selected such that the total spring constant in machine direction is the sum of the compression spring constant and the shear spring constant of a stopper similar to FIG. 1b. Because the shear spring constant is depending only on the area it is equal also in side direction and in this way additional rigidity is gained in side direction. Previous one had two dimensioning natural frequencies with the stoppers. Now the natural frequencies in machine direction and side direction are same. The thickness of the rubber is smaller than previous and in this way a large vertical rigidity is gained. The thinner rubber is lasting better because heat is conducted better away thereof. The rubber is vulcanized to steel plates 202, 203 and the steel plates are fixed with bolts to a support of the crusher and to the frame 121 of the chassis. This method of fixing is in the front end 101 of the crusher where exist higher vertical dynamic stresses than in the rear end due to the mechanism. In the rear end of the crusher the support or the body is machined at the bottom surface and is lying freely on the second damper 220 which is fixed only with bolts to the frame 121 of the chassis.

With high impulse load the contact surface in question has a friction damping during sliding. The free end is trying to move also in side direction due to crushing side forces. The dampers of the front end and friction are preventing this movement. The staying fixed of the crusher in exceptional high side loads is secured by a machined step 215 (side support). The horizontal dynamic force coming from the mechanism is distributed evenly to all rubber dampers.

Figure 3:
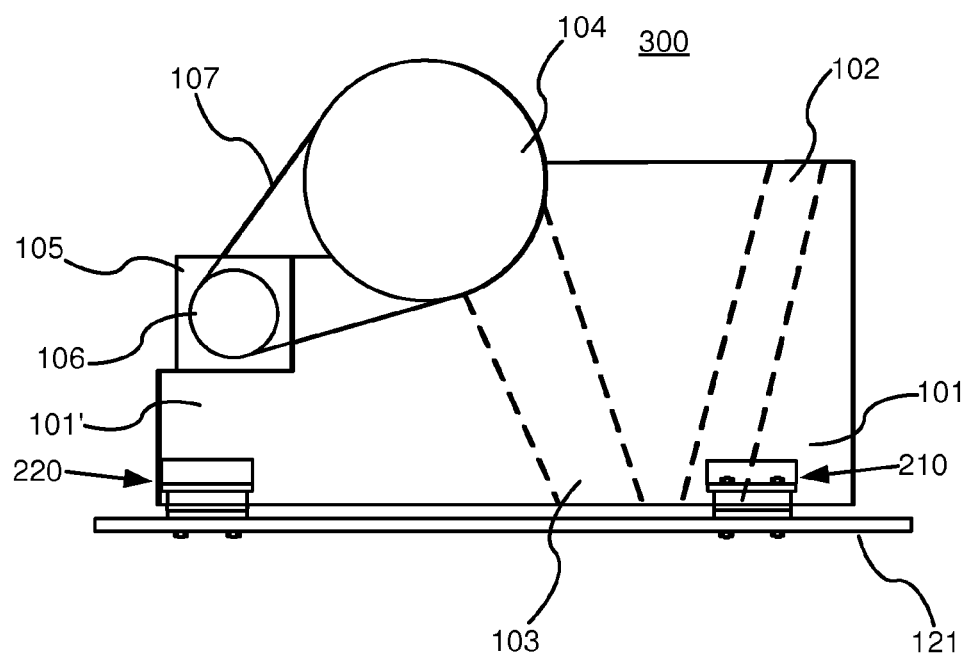
FIG. 3 shows a fixing of a jaw crusher to a frame of a processing plant with the dampers of FIGS. 2a and 2b.

FIG. 3 shows fixing of the jaw crusher to the frame of the processing plant with the fixing means of FIGS. 2a and 2b. It is preferable to locate the second damper 220 with a slide joint to that end of the crusher 300 in which the weight is higher wherein the advantage to be gained from the friction is higher, respectively. Typically, the end of the jaw crusher at the movable jaw is corresponding that description due to, among others, the weight caused by motor, transmission, and fly and belt wheel, and shaft and pitman. The slide joint can alternatively be located also turned up and down against the frame of the processing plant.

Figure 4:
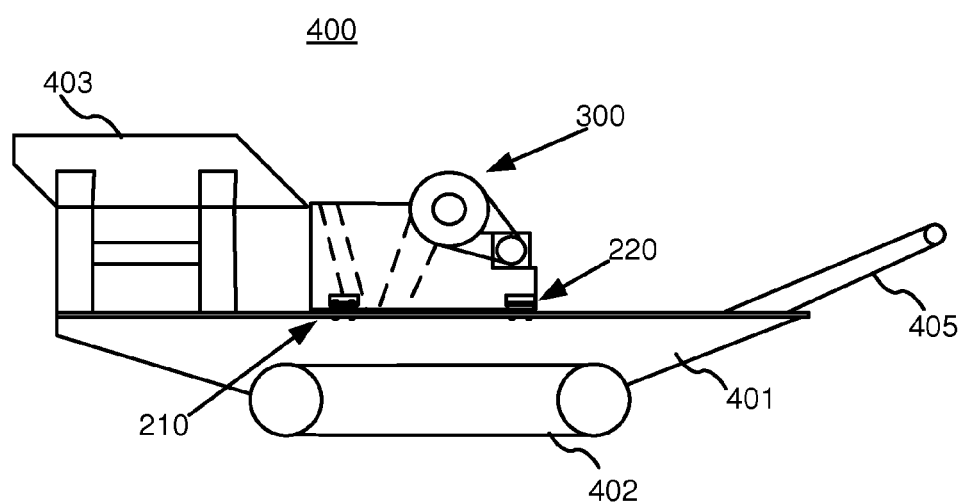
FIG. 4 shows a processing plant according to an embodiment of the invention.

FIG. 4 shows a movable track-based mineral material processing plant 400 which comprises a feeder 403. The feeder preferably comprises also a conveyor. The processing plant comprises a crusher 300 such as a jaw crusher, and a frame 401, a discharge conveyor 405 and a track base 402. The mineral material processing plant can also be movable by other means such as wheels, runners or legs or it can also be a stationary plant.

The processing plant comprises a feeder hopper 403 above a feed opening of a crushing chamber of the crusher 300. During operation of the crushing process the material to be crushed is fed to the feeder 403, wherefrom it further is fed by a conveyor to the crusher 300. The feeder 403 can also be a so called scalper feeder. The material to be crushed coming from the conveyor is lead by the feeder hopper to the feed opening. The material to be crushed van be fed to the feeder hopper also directly, for example by a loader.

The processing plant comprises also dampers 201, 220 for fixing the crusher 300 to the frame 401 of the processing plant which dampers were demonstrated in more detail in connection with FIGS. 2a and 2b.

The foregoing description provides non-limiting examples of some embodiments of the invention. It is clear to a person skilled in the art that the invention is not restricted to details presented, but that the invention can be implemented in other equivalent means. Some of the features of the above-disclosed embodiments may be used to advantage without the use of other features As such, the foregoing description shall be considered as merely illustrative of the principles of the invention, and not in limitation thereof. Hence, the scope of the invention is only restricted by the appended patent claims.

The invention claimed is:

1. A mineral material processing plant comprising:
    a frame having at least two upper support surfaces at a distance from each other in longitudinal direction of the processing plant;
    a jaw crusher comprising a crusher body having at least two bottom support surfaces at a longitudinal distance from each other;
    a damper between the bottom and upper support surfaces;
    wherein the damper comprises:
    a first counterpart of a bottom support surface;
    a second counterpart of an upper support surface; and
    an elastic material layer between said counterparts, wherein the elastic material layer is fixed non-detachable to the first counterpart and to the second counterpart.

2. The mineral material processing plant according to claim 1, further comprising:
    a slide joint between the first counterpart and the bottom support surface; and
    a bolt or welding joint between the second counterpart and the upper support surface.

3. The mineral material processing plant according to claim 1, wherein the damper comprises a bolt or welding joint between the first counterpart and the bottom support surface or upper support surface, and between the second counterpart and the upper support surface or bottom support surface.

4. The mineral material processing plant according to claim 1, wherein the elastic material layer of the damper is of rubber.

5. The mineral material processing plant according to claim 4, wherein the hardness of rubber used in the elastic material layer is 40 to 80 ShA.

6. The mineral material processing plant according to claim 5, wherein the hardness of rubber used in the elastic material layer is 60 ShA.

7. The mineral material processing plant according to claim 4, wherein:
    the first counterpart and the second counterpart are formed from steel; and
    the elastic material layer of the damper is vulcanized to the first counterpart and the second counterpart.

8. The mineral material processing plant according to claim 1, further comprising a side support arranged to the damper or to the frame or to the body of the crusher for positioning the frame or body relative to the damper.

9. The mineral material processing plant according to claim 1, further comprising:
    a slide joint between the first counterpart and the upper support surface; and
    a bolt or welding joint between the second counterpart and the bottom support surface.

10. The mineral material processing plant according to claim 1, further comprising:
    a slide joint between the second counterpart and the upper support surface; and
    a bolt or welding joint between the first counterpart and the bottom support surface.

11. The mineral material processing plant according to claim 1, comprising at least two of the dampers.

12. A method for damping a jaw crusher in a mineral material processing plant which comprises a processing plant frame having at least two upper support surfaces at a distance from each other in longitudinal direction of the processing plant, and a jaw crusher comprising a crusher body having at least two bottom support surfaces at a longitudinal distance from each other, the method comprising:
    damping the jaw crusher against impact-like loads using a damper in between the bottom support surface and the upper support surface;
    wherein the damper comprises a first counterpart of a bottom support surface, a second counterpart of an upper support surface, and an elastic material layer between said counterparts;
    wherein the elastic material layer is fixed non-detachable to the first counterpart and to the second counterpart.

13. The method according to claim 12, wherein the damper has a shearing constant in side direction substantially equal to that in machine direction.

14. The method according to claim 12, further comprising damping at substantially one natural frequency with the damper.

* * * * *